US012053992B2

(12) United States Patent
Kaminaga

(10) Patent No.: US 12,053,992 B2
(45) Date of Patent: Aug. 6, 2024

(54) PRINTING APPARATUS

(71) Applicant: SEIKO EPSON CORPORATION, Tokyo (JP)

(72) Inventor: Satoshi Kaminaga, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 130 days.

(21) Appl. No.: 17/804,323

(22) Filed: May 27, 2022

(65) Prior Publication Data

US 2022/0379640 A1 Dec. 1, 2022

(30) Foreign Application Priority Data

May 31, 2021 (JP) ................................ 2021-091208

(51) Int. Cl.
*B41J 29/13* (2006.01)

(52) U.S. Cl.
CPC .................................... *B41J 29/13* (2013.01)

(58) Field of Classification Search
CPC ............... B41J 29/01; B41J 2/32; B41J 29/13
See application file for complete search history.

(56) References Cited

U.S. PATENT DOCUMENTS

| | | | | |
|---|---|---|---|---|
| 8,585,304 | B2 * | 11/2013 | Yokoyama | B41J 3/4075 400/583 |
| 9,862,205 | B2 | 1/2018 | Obara | |
| 2017/0266996 | A1 | 9/2017 | Obara | |
| 2018/0272773 | A1 | 9/2018 | Kubota | |

FOREIGN PATENT DOCUMENTS

| | | |
|---|---|---|
| CN | 106457850 | 2/2017 |
| JP | 2001-018940 A | 1/2001 |

* cited by examiner

*Primary Examiner* — Geoffrey S Mruk
(74) *Attorney, Agent, or Firm* — WORKMAN NYDEGGER

(57) ABSTRACT

A printing apparatus includes a printing portion configured to perform printing on a recording sheet that has a recording surface and an adhesive surface provided opposite to the recording surface, a case in which a discharge port for discharging the recording sheet printed by the printing portion is formed on a first surface, and a non-adhesive member mounted in a state of covering at least a portion of the first surface of the case.

8 Claims, 5 Drawing Sheets

PRINTING APPARATUS

The present application is based on, and claims priority from JP Application Serial Number 2021-091208, filed May 31, 2021, the disclosure of which is hereby incorporated by reference herein in its entirety.

BACKGROUND

1. Technical Field

The present disclosure relates to a printing apparatus.

2. Related Art

As described in JP-A-2001-18940, an apparatus which includes a discharge port for discharging a standard-sized label released from a carrier serving as a backing sheet by a release body and in which a non-adhesive sheet is attached to a surface of the discharge port has been known.

It is difficult for the aforementioned apparatus to deal with a non-standard-sized label having no backing sheet.

SUMMARY

A printing apparatus includes a printing portion configured to perform printing on a recording sheet that has a recording surface and an adhesive surface provided opposite to the recording surface, a case in which a discharge port for discharging the recording sheet printed by the printing portion is formed on a first surface, and a non-adhesive member mounted in a state of covering at least a portion of the first surface of the case.

DESCRIPTION OF EXEMPLARY EMBODIMENTS

A printing apparatus 10 (a printer) according to an embodiment will be described below with reference to the drawings.

Note that directions in each of the drawings will be described by using a three-dimensional coordinate system. For convenience of description, in the following description, a positive direction of the Z-axis is referred to as an up direction, a negative direction of the Z-axis is referred to as a down direction, a positive direction of the X-axis is referred to as a right direction or a right side, a negative direction of the X-axis is referred to as a left direction or a left side, a positive direction of the Y-axis is referred to as a rear direction, and a negative direction of the Y-axis is referred to as a front direction.

1. First Embodiment

Figure 1:
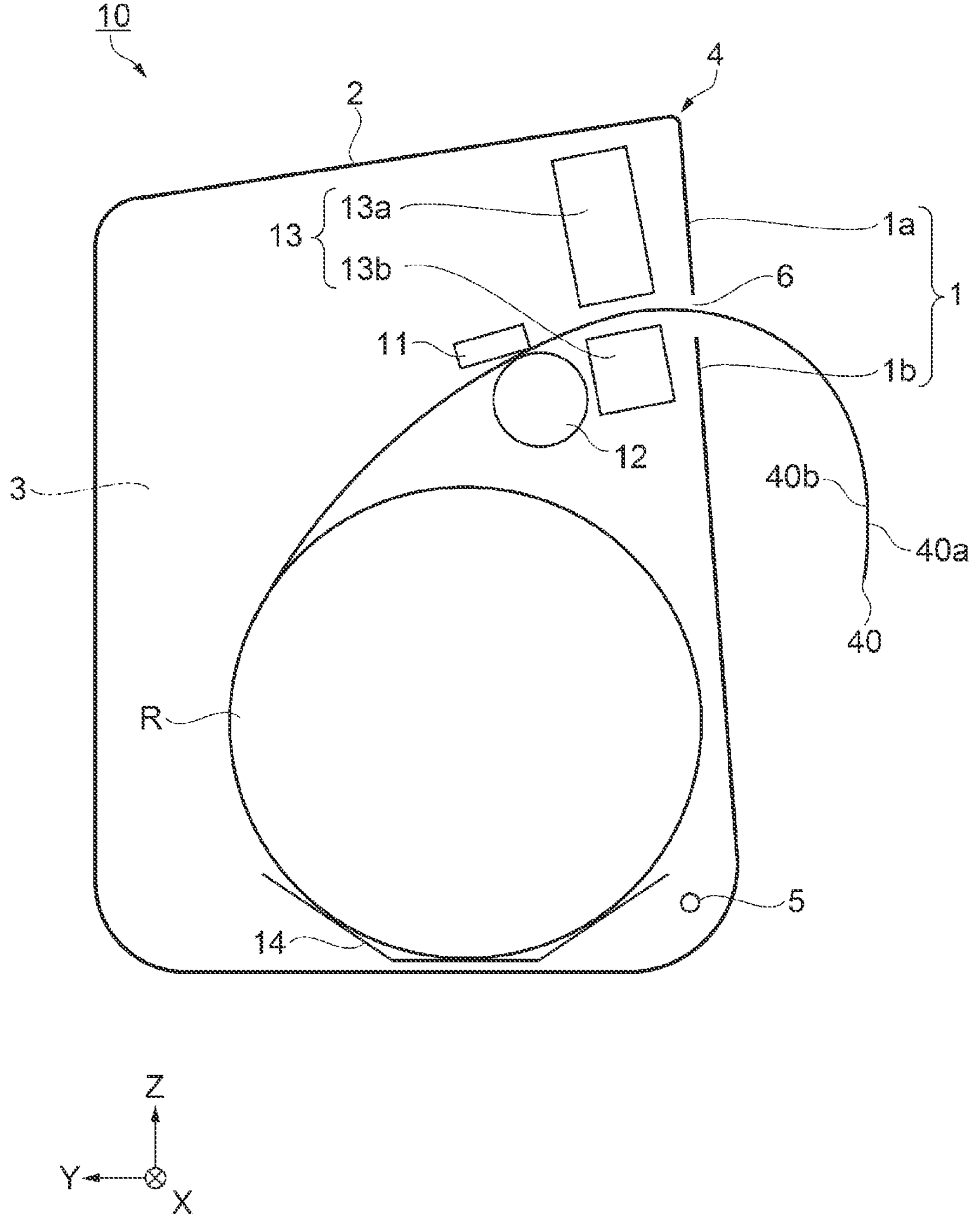
FIG. 1 is a sectional view of a printing apparatus in a first embodiment.

As illustrated in FIG. 1, the printing apparatus 10 according to a first embodiment includes a printing portion 11, a roller 12, a cutter 13, a case 4, and a discharge port 6.

A recording sheet 40 is transported by the roller 12, printed by the printing portion 11, cut by the cutter 13, and discharged from the discharge port 6 as a non-standard-sized label. Note that, in the following description, a non-standard-sized label discharged from the discharge port 6 is also referred to as the recording sheet 40 in some cases.

The recording sheet 40 is a so-called linerless label which is an elongated continuous label having no backing sheet. In this manner, the linerless label has a configuration different from that of a so-called die-cut label in which a plurality of standard-sized labels are attached to a backing sheet.

The recording sheet 40 includes a recording surface 40*a* and an adhesive surface 40*b* provided opposite to the recording surface 40*a*. An adhesive is applied to the adhesive surface 40*b*. On the other hand, the configuration is such that, since a release agent is applied to the recording surface 40*a*, even when the recording sheet 40 is wound, the recording surface 40*a* does not adhere to the adhesive surface 40*b*. The recording sheet 40 is wound in a roll shape with the adhesive surface 40*b* on the inside and accommodated as a paper roll R in a container 14 in a lower portion of the case 4. The container 14 may be referred to as a paper roll holder.

The printing portion 11 includes, for example, a thermal head. The roller 12 is arranged so as to face the thermal head across the recording sheet 40. The roller 12 at a position facing the thermal head is also called a platen roller.

Not only the release agent but also a color developing agent are applied to the recording surface 40*a* of the recording sheet 40. The thermal head of the printing portion 11 generates heat to enable the color developing agent on the recording surface 40*a* of the recording sheet 40 to develop a color and prints characters or the like.

The printing portion 11 also includes a pressing mechanism that presses the thermal head against the roller 12. The pressing mechanism enables the recording sheet 40 to be held between the thermal head and the roller 12. When the roller 12 rotates in such a state, the recording sheet 40 held between the thermal head and the roller 12 is transported.

The roller 12 also has a force of drawing the recording sheet 40 from the paper roll R accommodated in the container 14 to transport the recording sheet 40.

The roller 12 is formed of non-adhesive silicone rubber. The roller 12 may be configured to have a surface that has been subjected to non-adhesive silicone resin coating or non-adhesive fluorine resin coating. In this manner, even when the roller 12 comes into contact with the adhesive surface 40*b* of the recording sheet 40, it is possible to suppress an adhesive from adhering to the roller 12.

The cutter 13 is arranged downstream of the printing portion 11 and the roller 12 in a transport direction. The cutter 13 includes a first blade 13*a* and a second blade 13*b*. The recording sheet 40 is transported by the roller 12 so as to pass between the first blade 13*a* and the second blade 13*b*. The first blade 13*a* is able to move to the second blade 13*b* to cut the recording sheet 40 between the first blade 13*a* and the second blade 13*b*. In this manner, the cutter 13 is able to cut the elongated recording sheet 40 to any dimension.

The first blade 13*a* and the second blade 13*b* have surfaces that have been subjected to non-adhesive silicone resin coating or non-adhesive fluorine resin coating. When the first blade 13*a* and the second blade 13*b* cut the recording sheet 40, it is possible to suppress the adhesive on the recording sheet 40 from adhering to the first blade 13*a* or the second blade 13*b*.

The case 4 includes a first case surface 1 that forms a first surface of the printing apparatus 10 in the front direction, a second case surface 2 that forms a second surface of the printing apparatus 10 in the up direction, and a third case surface 3 that forms a third surface of the printing apparatus 10 in the left direction. Further, the first case surface 1 includes a first case portion 1*a* and an opening/closing cover 1*b*, which is a first cover.

The opening/closing cover 1*b* is rotatable in the front direction of the printing apparatus 10 about a hinge 5 located in a front lower portion of the case 4. In this manner, the opening/closing cover 1*b* enables the container 14 to be open and closed. By opening the opening/closing cover 1*b*, a user is able to place the paper roll R, which is obtained by forming the recording sheet 40 into a roll, into the container 14. After drawing the recording sheet 40 from the paper roll R by a predetermined amount, the user closes the opening/closing cover 1*b* to cover the container 14 in which the paper roll R is accommodated and sets the recording sheet 40 so as to be held between the thermal head of the printing portion 11 and the roller 12. As a result, the printing portion 11 is ready to perform printing on the recording sheet 40.

When the opening/closing cover 1*b* is in a closed state, the discharge port 6 for discharging the recording sheet 40 is formed between the opening/closing cover 1*b* and the first case portion 1*a*. In this manner, the discharge port 6 is formed on the first surface of the case 4.

Note that the printing apparatus 10 is usable in both a so-called standing posture in which the discharge port 6 faces the front direction as illustrated in FIG. 1 and a so-called lying posture in which the discharge port 6 faces the up direction.

Regardless of whether the printing apparatus 10 is in the standing posture or the lying posture, the recording sheet 40 is drawn and transported from the container 14 by the roller 12, subjected to printing by the printing portion 11, cut to any dimension by the cutter 13, issued as a non-standard-sized label, and discharged from the discharge port 6.

The printing apparatus 10 according to the first embodiment is constituted by the first case portion 1*a* or the opening/closing cover 1*b* of the first case surface 1, which is an example of a non-adhesive member mounted in a state of covering at least a portion of the first surface of the case 4 and which is formed by using a silicone material as a non-adhesive material.

Specifically, for example, the first case portion 1*a* or the opening/closing cover 1*b* is constituted by an elastomer molded by using a silicone material. The first case portion 1*a* or the opening/closing cover 1*b* may be configured such that a so-called plastic resin and a silicone material provided outside the plastic resin are integrated by co-injection molding so as to have an outer surface formed of a non-adhesive elastomer. The silicone material contains resin and enables molding.

The elastomer molded by using a silicone material is able to suppress the recording sheet 40 from adhering to the first case portion 1*a* or the opening/closing cover 1*b*.

When the printing apparatus 10 is used in the standing posture illustrated in FIG. 1, the recording sheet 40 discharged from the discharge port 6 is bent so as to approach the opening/closing cover 1*b*, and the adhesive surface 40*b* of the recording sheet 40 is thus likely to come into contact with and adhere to the opening/closing cover 1*b*. Accordingly, the opening/closing cover 1*b* that covers at least a portion of the first surface of the case 4 is desirably an elastomer molded by using a silicone material.

On the other hand, when the printing apparatus 10 is used in the lying posture, the recording sheet 40 discharged from the discharge port 6 is bent so as to approach the first case portion 1*a*, and the recording surface 40*a* of the recording sheet 40 is thus likely to come into contact with and adhere to the first case portion 1*a*. This is because, although a release agent is applied to the recording surface 40*a* of the recording sheet 40, when the recording sheet 40 is wound into the paper roll R, an adhesive on the adhesive surface 40*b* may slightly adhere to the recording surface 40*a*. Accordingly, the first case portion 1*a* that covers at least a portion of the first surface of the case 4 is desirably an elastomer molded by using a silicone material.

Further, both the opening/closing cover 1*b* and the first case portion 1*a* that cover the first surface of the case 4 are desirably an elastomer molded by using a silicone material such that the printing apparatus 10 is able to operate in both the standing posture and the lying posture.

As described above, the recording sheet 40 discharged from the discharge port 6 of the printing apparatus 10 has a non-standard size. Accordingly, the discharged recording sheet 40 may adhere to any of the opening/closing cover 1*b* and the first case portion 1*a* depending on the posture of the printing apparatus 10.

However, since the printing apparatus 10 according to the first embodiment is constituted by the first case portion 1*a* or the opening/closing cover 1*b* formed by using a silicone material as the non-adhesive member mounted in a state of covering at least a portion of the first surface of the case 4, it is possible to suppress the recording sheet 40 from adhering to the first surface of the case 4.

Note that, as the non-adhesive member, the first case portion 1*a* or the opening/closing cover 1*b* may be formed of resin, which is an example of plastic, having a surface that has been subjected to silicone resin coating or fluorine resin coating.

2. Second Embodiment

Figure 2:
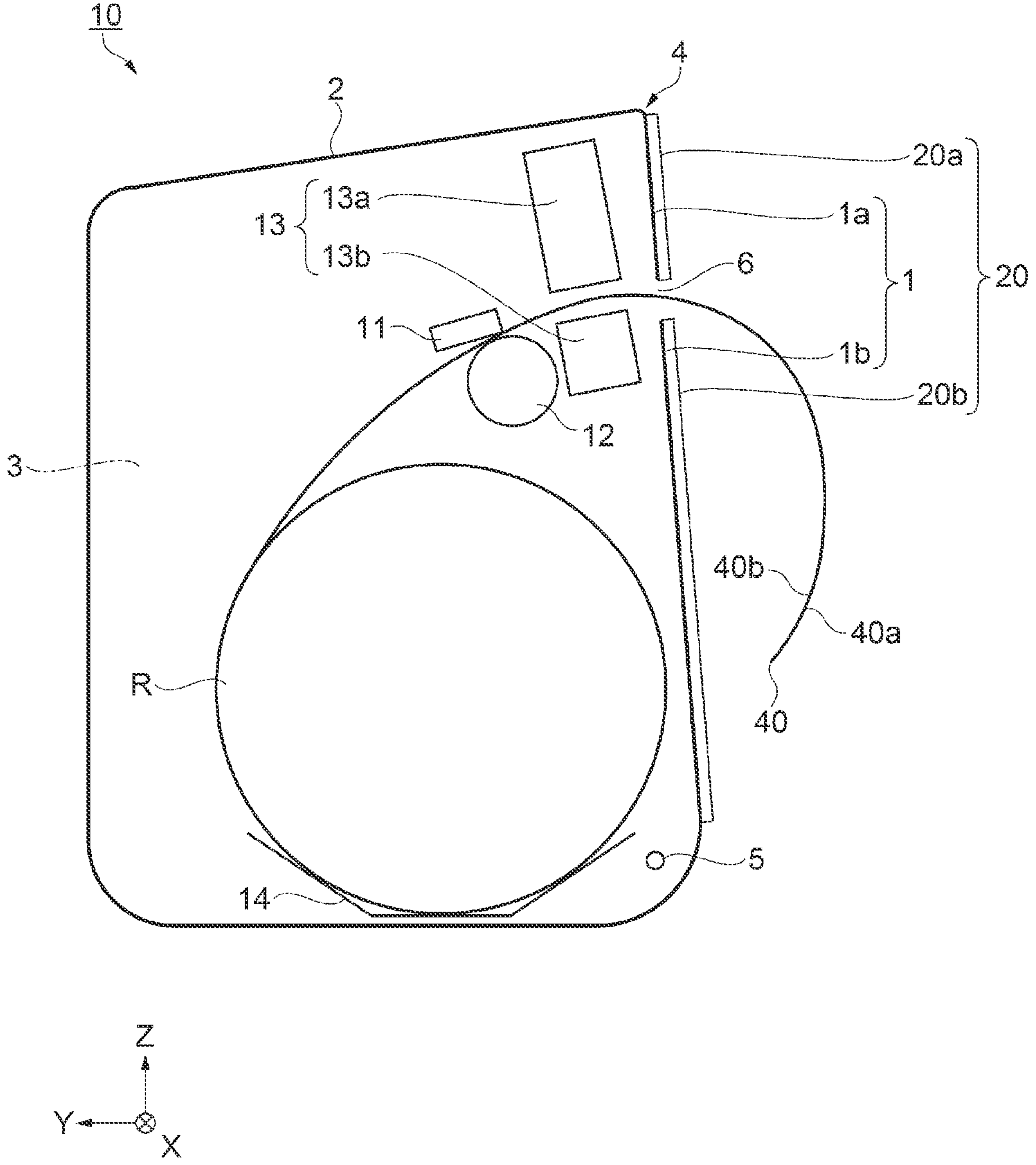
FIG. 2 is a sectional view of a printing apparatus in which a non-adhesive sheet is attached in a second embodiment.

As illustrated in FIG. 2, the printing apparatus 10 according to a second embodiment uses a non-adhesive sheet 20, which is a sheet of a non-adhesive member mounted in a state of covering at least a portion of the first surface of the case 4. The non-adhesive sheet 20 is mounted in a state of being attached to at least the first case portion 1*a* or the opening/closing cover 1*b* that forms the first surface of the case 4. The non-adhesive sheet 20 includes a first non-adhesive sheet 20*a* and a second non-adhesive sheet 20*b*. The first non-adhesive sheet 20*a* is able to be mounted in a state of being attached to the first case portion 1*a*, and the second non-adhesive sheet 20*b* is able to be mounted in a state of being attached to the opening/closing cover 1*b*.

The non-adhesive sheet 20 attached to the first surface of the case 4 is able to suppress the recording sheet 40 from adhering to the first case portion 1*a* or the opening/closing cover 1*b*. In the following description, description of the same portions as the printing apparatus 10 according to the first embodiment will be omitted.

Figure 3:
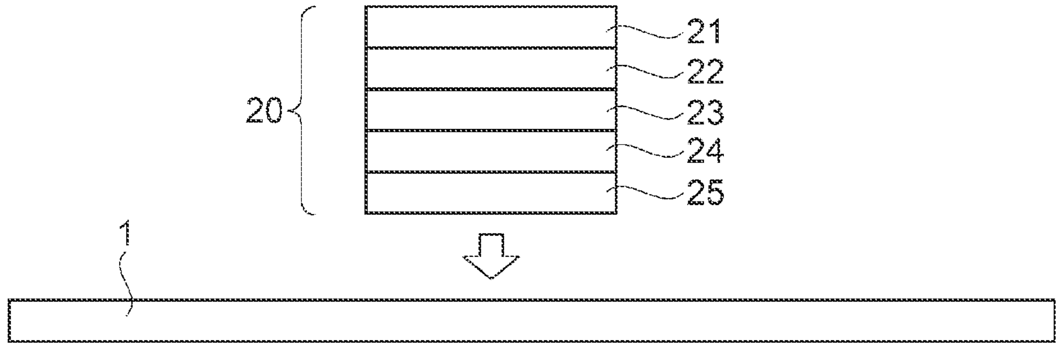
FIG. 3 is a structural view of the non-adhesive sheet in the second embodiment.

An example of the configuration of the non-adhesive sheet 20 will be specifically described for each of the layers. As illustrated in FIG. 3, the non-adhesive sheet 20 includes a base material 22, which is a polyethylene terephthalate (PET) sheet, and a non-adhesive film 21 having a surface that has been subjected to silicone resin coating or fluorine resin coating is formed on one surface of the base material 22 as a non-adhesive material. A first print layer 23 serving as a print layer on which an icon or a logotype is printed, further, a second print layer 24 serving as a print layer on which a case color indicating a color of the first surface of the case 4 is printed, and an adhesive layer 25 to which an acrylic adhesive material is applied are formed in this order on the other surface of the base material 22 of the non-adhesive sheet 20.

The non-adhesive sheet 20, which is the non-adhesive member, is attached to the first case surface 1, which is the first surface of the case 4, by using the adhesive layer 25. The non-adhesive film 21 of the non-adhesive sheet 20 attached to the outer surface of the first case surface 1 is able to suppress the recording sheet 40 from adhering to the first case surface 1.

The non-adhesive sheet 20 covers a display 15 and an operation section 16 provided in the first case surface 1, which is the first surface of the case 4. The configuration of each of the display 15 and the operation section 16, and the non-adhesive sheet 20 will be specifically described with reference to FIG. 4.

Figure 4:
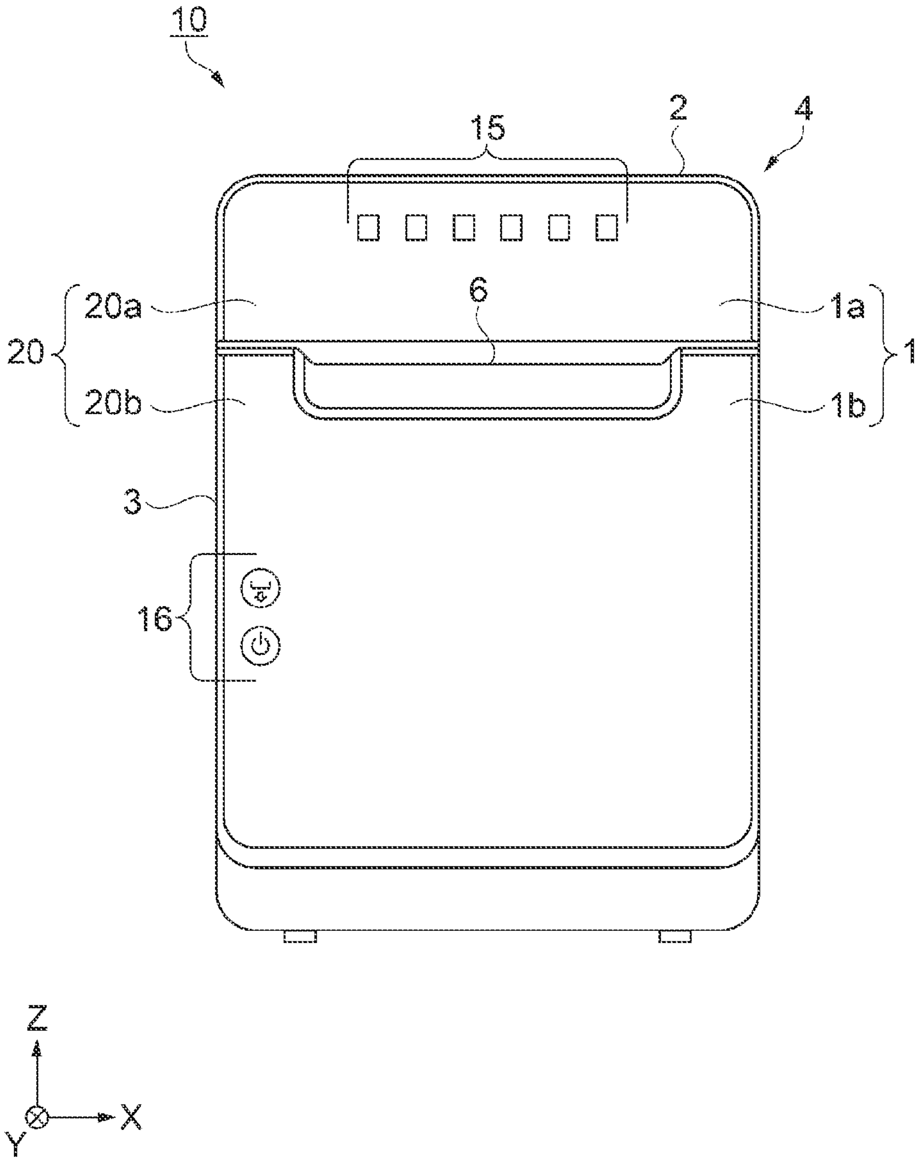
FIG. 4 is a front view of the printing apparatus in which the non-adhesive sheet is attached in the second embodiment.

The display 15 is arranged at a position close to the second case surface 2 in the first case portion 1*a* of the first case surface 1. The display 15 includes, for example, an LED for notifying the user of predetermined information. As illustrated in FIG. 4, a plurality of LEDs of the display 15 are provided in the first case portion 1*a* so as to be aligned in the right-left direction. In this manner, the display 15 is arranged in an upper portion of the printing apparatus 10 such that, even when the printing apparatus 10 is in the standing posture, the user may easily see the display 15.

The first non-adhesive sheet 20*a* is attached so as to cover the LEDs of the display 15 provided in the first case portion 1*a*. An icon indicating predetermined information is printed on the first print layer 23 of the first non-adhesive sheet 20*a* so as to correspond to the LEDs of the display 15. For example, an icon indicating a paper roll is printed on the first print layer 23, and an LED corresponding thereto is provided. Illumination of the LED indicates, as predetermined information, that no recording sheet 40 is present. Additionally, predetermined information, such as communication status or occurrence of an error, is able to be notified by combining an LED and a printed icon.

Moreover, a logotype of a company name, a product name, or the like is also printed on the first print layer 23 of the non-adhesive sheet 20. Note that an icon is printed on the first print layer 23 of the first non-adhesive sheet 20*a* such that a portion other than the printed icon is transparent and enables light of the LED to be readily transmitted.

The second print layer 24 of the non-adhesive sheet 20 is subjected to metallic printing to correspond to the metal color of stainless steel or the like as the case color indicating the color of the first surface of the case 4.

Due to the presence of the second print layer 24 subjected to printing, such as metallic printing, with high density, light of the LED of the display 15 is blocked, and the user is not able to see the light in some cases. Accordingly, the second print layer 24 of the first non-adhesive sheet 20*a* at a position overlapping the LED of the display 15 may be removed to enable the light of the LED to be readily emitted.

The operation section 16 is arranged at a position close to the third case surface 3 in the opening/closing cover 1*b* of the first case surface 1. The operation section 16 includes, for example, a switch. As illustrated in FIG. 4, a plurality of switches of the operation section 16 are provided in the opening/closing cover 1*b* so as to be aligned in the up-down direction. In this manner, the operation section 16 is arranged such that, even when the printing apparatus 10 is in the standing posture, the user is able to easily operate the operation section 16.

The second non-adhesive sheet 20*b* is attached in a state of covering the switch of the operation section 16 provided in the opening/closing cover 1*b*. An icon indicating a function of the switch is printed on the first print layer 23 of the second non-adhesive sheet 20*b* so as to correspond to the switch of the operation section 16. For example, an icon indicating power is printed on the first print layer 23 of the second non-adhesive sheet 20*b*. By visually identifying the printed icon indicating the power and operating the switch corresponding to the power, the user is able to power on the printing apparatus 10. Additionally, in a configuration in which a paper feed switch and a printed icon are combined, the user is able to feed the recording sheet 40 by visually identifying such a printed icon to operate the paper feed switch.

Note that, in contrast to the display 15, since the operation section 16 includes no LED, the second print layer 24 of the second non-adhesive sheet 20*b* at a position overlapping the switch of the operation section 16 is not necessarily removed.

When the printing apparatus 10 is used in the standing posture illustrated in FIGS. 2 and 4, the second non-adhesive sheet 20*b* is desirably attached to the opening/closing cover 1*b* to suppress the recording sheet 40 discharged from the discharge port 6 from coming into contact with and adhering to the opening/closing cover 1*b*.

On the other hand, when the printing apparatus 10 is used in the lying posture, the first non-adhesive sheet 20*a* is desirably attached to the first case portion 1*a* to suppress the recording sheet 40 discharged from the discharge port 6 from adhering to the first case portion 1*a*.

Further, the second non-adhesive sheet 20*b* and the first non-adhesive sheet 20*a* are desirably attached to the opening/closing cover 1*b* and the first case portion 1*a*, respectively, such that the printing apparatus 10 is able to operate in both the standing posture and the lying posture.

The printing apparatus 10 is also able to perform printing on typical thermal paper, which is a recording sheet 40 having no adhesive surface 40*b*. The printing apparatus 10 for performing printing on only thermal paper may be shipped from the factory with a specification in which the non-adhesive sheet 20 is not attached. Even in the printing apparatus 10 having such a specification, in a case in which the non-adhesive sheet 20 is prepared as an option, when desiring to subsequently use a linerless label, the user is able to easily use a linerless label by attaching the non-adhesive sheet 20, as an option, to the first case surface 1 of the printing apparatus 10.

Note that, when a sticker on which an icon or a logotype is printed is used instead of the first print layer 23 on which an icon or a logotype is printed, the first print layer 23 is not necessarily required. Moreover, when a coating is applied to the first case surface 1 instead of the second print layer 24 indicating the case color being provided, the second print layer 24 is not necessarily required.

Moreover, another print layer subjected to, for example, black printing may be added to the non-adhesive sheet 20 in addition to the first print layer 23 and the second print layer 24 such that the surface of the first case surface is not visible through the non-adhesive sheet 20.

3. Third Embodiment

Figure 5:
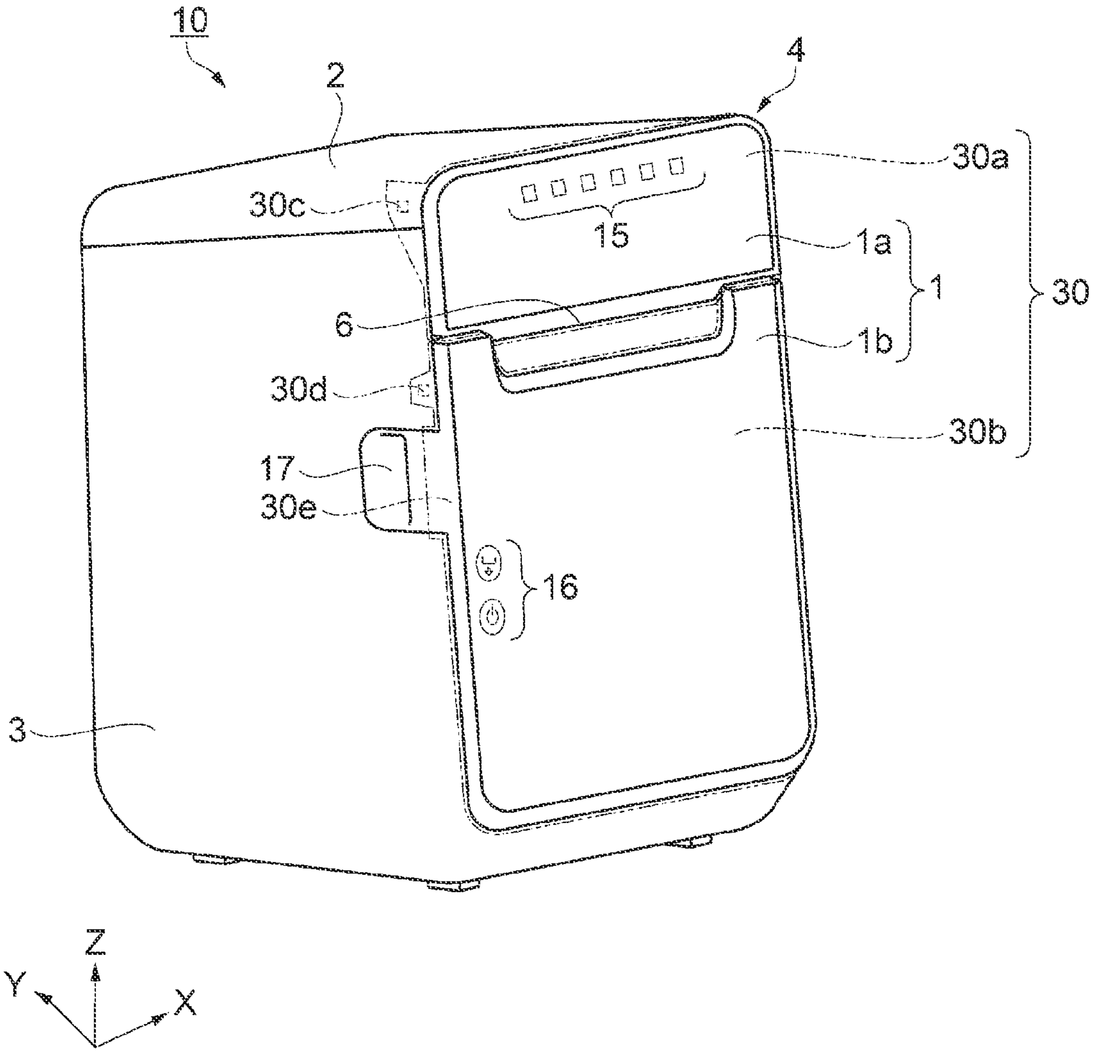
FIG. 5 is a perspective view of a printing apparatus on which a non-adhesive cover is mounted in a third embodiment.

As illustrated in FIG. 5, the printing apparatus 10 according to a third embodiment is constituted by a non-adhesive cover 30 which is an example of a non-adhesive member mounted in a state of covering at least a portion of the first surface of the case 4 and which includes a non-adhesive material. The non-adhesive cover 30 includes a second cover 30*b* and a third cover 30*a*. The second cover 30*b* is able to be mounted so as to cover the opening/closing cover 1*b*, and the third cover 30*a* is able to be mounted so as to cover the first case portion 1*a*.

At least the second cover 30*b* or the third cover 30*a* is mounted on the printing apparatus 10. The second cover 30*b* or the third cover 30*a* is able to suppress the recording sheet 40 from adhering to the first case portion 1*a* or the opening/closing cover 1*b*. In the following description, description of the same portions as the printing apparatus 10 according to the first embodiment will be omitted.

Specifically, the third cover 30*a* or the second cover 30*b*, which is the non-adhesive member, contains silicone resin, which is the non-adhesive material. The third cover 30*a* or the second cover 30*b* may be obtained by subjecting transparent resin, such as acrylic resin, to coating with silicone resin or fluorine resin, which is a non-adhesive material.

The third cover 30*a* or the second cover 30*b* that contains such a non-adhesive material is mounted on the first case portion 1*a* or the opening/closing cover 1*b*, thus making it possible to suppress the recording sheet 40 from adhering to the first case portion 1*a* or the opening/closing cover 1*b*.

First, the second cover 30*b* of the non-adhesive cover 30 will be described. As illustrated in FIG. 5, the second cover 30*b* includes a second cover fixing section 30*d*. The second cover 30*b* is able to be mounted on the opening/closing cover 1*b* by using the second cover fixing section 30*d*. In a state of being mounted on the opening/closing cover 1*b*, the second cover 30*b* is openable/closable together with the opening/closing cover 1*b*. The second cover fixing section 30*d* may be further provided on the right side such that the second cover 30*b* is mounted so as to hold the opening/closing cover 1*b* between second cover fixing sections 30*d*.

Note that a portion of the second cover 30*b*, which is at a position overlapping the operation section 16, may be removed. The user is able to operate the operation section 16 through an opening formed by removing the portion of the second cover 30*b* without detaching the second cover 30*b*.

The operation section 16 is arranged at a position close to the third case surface 3 in the opening/closing cover 1*b*. Accordingly, the operation section 16 is provided in the opening/closing cover 1*b* at a position away from the discharge port 6 in the left direction. The operation section 16 is located at a position at which it is difficult for the recording sheet 40 to come into contact with the operation section 16 even when the recording sheet 40 is discharged from the discharge port 6. Moreover, since the recording sheet 40 has a sheet width equal to or more than 35 cm, when the opening obtained by removing the portion of the second cover 30*b* has a size of substantially less than 35 cm, the recording sheet 40 does not adhere to the operation section 16 through the opening.

Meanwhile, the third case surface 3 that covers the printing apparatus 10 in the left direction includes a lever 17 for operating the opening/closing cover 1*b*. The lever 17 is of a push button type and is configured to open the opening/closing cover 1*b* when pressed by the user.

The second cover 30*b* includes a second cover extension 30*e* that extends in the rear direction so as to extend to the lever 17 of the third case surface 3 when the second cover 30*b* is mounted on the opening/closing cover 1*b*.

Since the lever 17 is movable, it is difficult for the non-adhesive cover 30 to be mounted on the lever 17 itself. Since the second cover extension 30*e*, which is a non-adhesive member, is configured to extend to the lever 17 in a state of covering a portion of the third case surface 3, it is possible to suppress the recording sheet 40 from adhering to the lever 17. Note that the second cover extension 30*e* of the second cover 30*b* is also able to be configured to cover at least a portion of the lever 17.

The lever 17 is provided in the third case surface 3 that forms the third surface of the case 4 which differs from the first case surface 1 that forms the first surface of the case 4. In other words, the lever 17 is not formed in the first case surface 1. Accordingly, it is possible to increase a range of the first case surface 1 in which the non-adhesive cover 30 serving as the non-adhesive member is able to be mounted. Covering a wide range of the first case surface 1 with the non-adhesive cover 30 is able to suppress the recording sheet 40 from adhering.

Note that the lever 17 may be further provided on the right surface of the first case surface 1 of the case 4, which faces the third case surface 3. The right and left levers 17 enable the opening/closing cover 1*b* to be stably opened/closed.

In such an instance, the second cover 30*b* may include the second cover extension 30*e* that also extends to the lever 17 provided on the right surface of the first case surface 1.

Note that the lever 17 is similarly provided in the third case surface 3 in both the first embodiment and the second embodiment described above. It is possible to suppress the recording sheet 40 from adhering to the lever 17. Moreover, also in the first case surface 1 serving as the non-adhesive member in the first embodiment and the first case surface 1, to which the non-adhesive sheet 20 serving as the non-adhesive member is attached, in the second embodiment, it is possible to similarly cover a wide range of the first case surface 1 in a state in which the non-adhesive member is mounted on the first case surface 1.

Next, the third cover 30*a* that forms the non-adhesive cover 30 will be described. The third cover 30*a* includes a third cover fixing section 30*c*. The third cover 30*a* is able to be mounted on the first case portion 1*a* in a state of being fixed to the second case surface 2 by using the third cover fixing section 30*c*. The third cover 30*a* may further include the third cover fixing section 30*c* on the right side and may have the right and left sides fixed to the second case surface 2. Moreover, the third cover 30*a* may be fixed to the third case surface 3 by using the third cover fixing section 30*c*.

Note that a portion of the third cover 30*a*, which is at a position overlapping the LED of the display 15, may be removed. This enables light of the LED to be readily emitted. The LED has a size within substantially 1 cm. Even when an opening of substantially 1 cm is formed in the third cover 30*a*, since the recording sheet 40 has a sheet width equal to or more than 35 cm, the recording sheet 40 does not adhere to the display 15 through the opening.

When the printing apparatus 10 is used in the standing posture illustrated in FIG. 5, the second cover 30*b* is desirably mounted on the opening/closing cover 1*b* to suppress the recording sheet 40 discharged from the discharge port 6 from coming into contact with and adhering to the opening/closing cover 1*b*.

On the other hand, when the printing apparatus 10 is used in the lying posture, the third cover 30*a* is desirably mounted on the first case portion 1*a* to suppress the recording sheet 40 discharged from the discharge port 6 from adhering to the first case portion 1*a*.

Further, the second cover 30*b* and the third cover 30*a* are desirably mounted on the opening/closing cover 1*b* and the first case portion 1*a*, respectively, such that the printing apparatus 10 is able to operate in both the standing posture and the lying posture.

The printing apparatus 10 for performing printing on only thermal paper may be shipped from the factory with a specification in which the non-adhesive cover 30 is not mounted, in some cases. In such a case, when the non-adhesive cover 30 is prepared as an option, in a case in which the user desires to subsequently use a linerless label, the user is able to easily use a linerless label by mounting the non-adhesive cover 30, as an option, on the first case surface 1 of the printing apparatus 10.

According to the printing apparatus 10 of each of the embodiments described above, as the non-adhesive member mounted in a state of covering at least a portion of the first case surface 1 of the case 4, the first case surface 1 according to the first embodiment is formed by using a silicone material, the first case surface 1 according to the second embodiment is formed with the non-adhesive sheet 20 attached thereto, and the first case surface 1 according to the third embodiment is formed with the non-adhesive cover 30 mounted thereon.

An adhesive is applied to the adhesive surface 40*b* of the recording sheet 40, and the recording sheet 40 discharged from the discharge port 6 of the printing apparatus 10 has a non-standard size. However, according to the embodiments, it is possible to suppress the recording sheet 40 from adhering to the first case surface 1 of the case 4.

Although the embodiments have been described above in detail with reference to the drawings, the specific configurations are not limited to the embodiments and may be modified, substituted, or deleted, for example, without departing from the gist of the disclosure.

With the first case surface 1 according to the first embodiment, the non-adhesive sheet 20 according to the second embodiment, and the non-adhesive cover 30 according to the third embodiment, another non-adhesive material may be used to deal with the adhesive applied to the recording sheet 40. Moreover, a non-adhesive member may be mounted on a case surface other than the first case surface 1 of the printing apparatus 10.

The printing portion 11 of the printing apparatus 10 has been described as using, for example, a thermal head but may use any printing system. The printing portion 11 may use, for example, an ink jet head. When an ink jet head or the like is used, the head does not come into contact with the recording sheet 40, and the printing apparatus 10 thus includes a pair of non-adhesive rollers for transporting the recording sheet 40. Specifically, the pair of rollers may be formed of non-adhesive silicone rubber or may have a surface that has been subjected to non-adhesive silicone resin coating or non-adhesive fluorine resin coating.

What is claimed is:

1. A printing apparatus comprising:

a printing portion configured to perform printing on a recording sheet that has a recording surface and an adhesive surface provided opposite to the recording surface;

a case in which a discharge port for discharging the recording sheet printed by the printing portion is formed on a first surface; and a non-adhesive member mounted in a state of covering at least a portion of the first surface of the case, wherein the non-adhesive member comprises a sheet including:

a base material, a non-adhesive film that is provided on one surface of the base material, and a print layer and an adhesive layer that are provided on another surface of the base material, and the non-adhesive member is attached to the first surface of the case by using the adhesive layer.

2. The printing apparatus according to claim 1, further comprising:

a container in which the recording sheet is accommodated; and a first cover that forms the first surface of the case and opens/closes the container, wherein when the first cover is closed, the discharge port is formed between the first cover and the case.

3. The printing apparatus according to claim 2, wherein the non-adhesive member further comprises a second cover that is configured to contain a non-adhesive material and the non-adhesive member is configured to be mounted on the first surface of the case.

4. The printing apparatus according to claim 3, wherein the second cover is configured to be mounted on at least the first cover.

5. The printing apparatus according to claim 2, wherein the non-adhesive member further comprises the first cover that is configured to contain a non-adhesive material.

6. The printing apparatus according to claim 2, further comprising a lever for operating the first cover, wherein the lever is provided on a surface of the case which differs from the first surface.

7. The printing apparatus according to claim 1, further comprising an operation section provided on the first surface of the case, wherein the operation section is covered with the sheet.

8. The printing apparatus according to claim 1, further comprising a display provided on the first surface of the case, wherein the display is covered with the sheet from which the print layer is removed.

* * * * *